Sept. 6, 1932.  D. PARKS  1,875,884
LEATHER GRADING MACHINE
Filed July 3, 1929  2 Sheets-Sheet 1
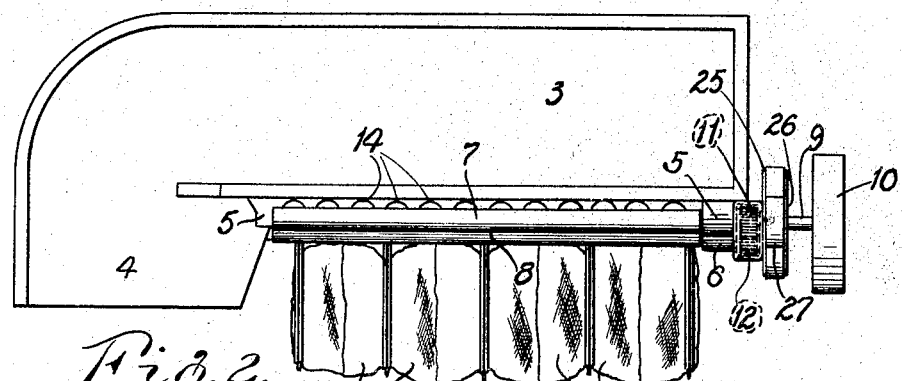
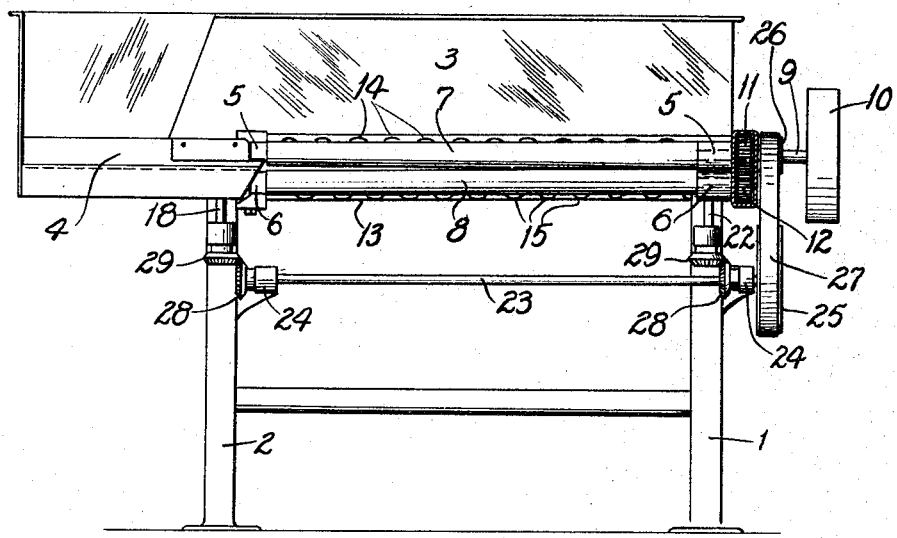
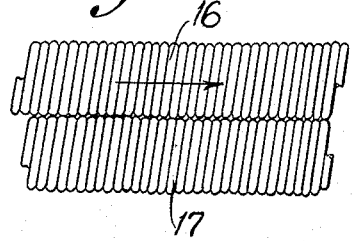
INVENTOR:
DENNIS PARKS
BY Bruce D. Elliott
ATTORNEY

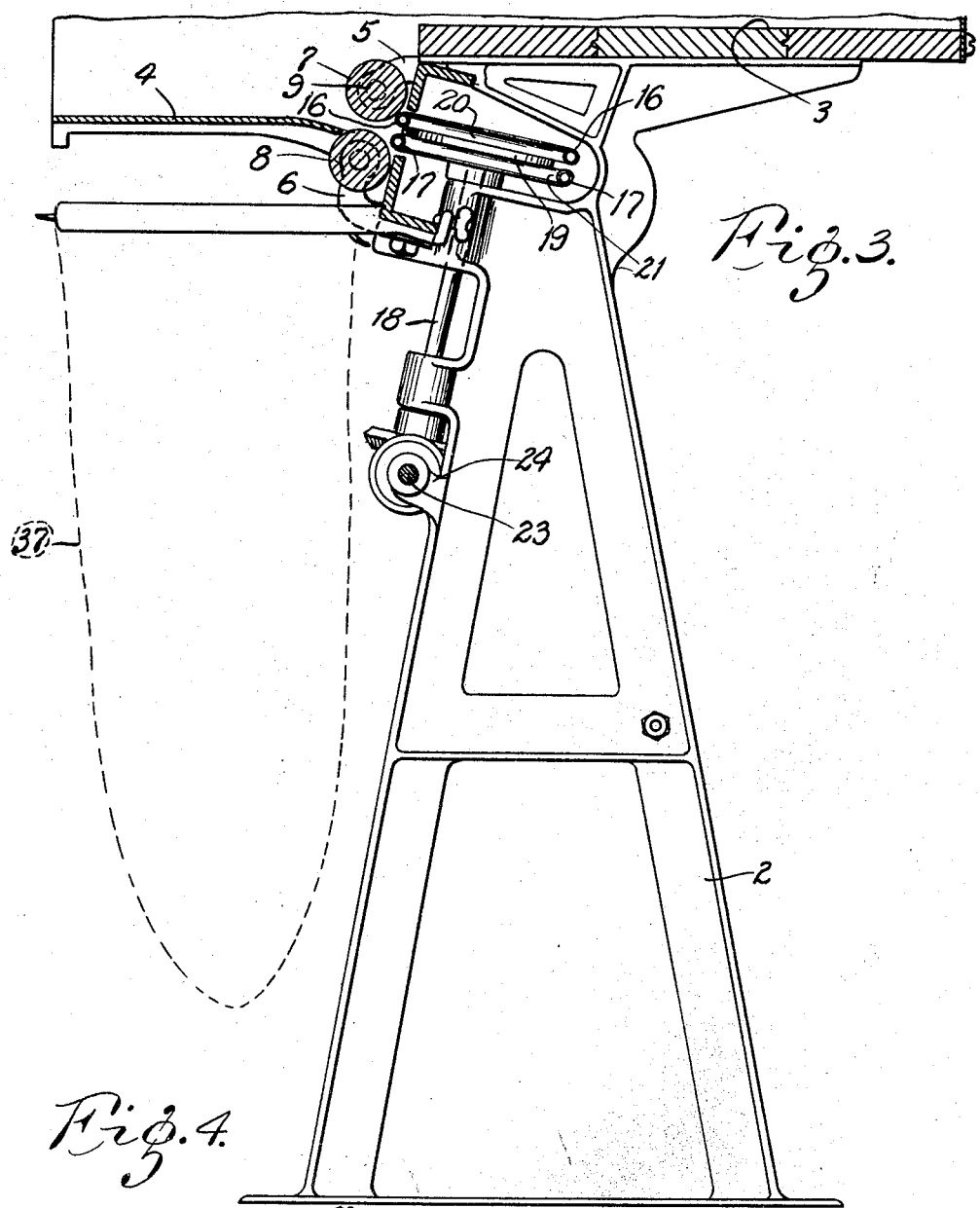

Patented Sept. 6, 1932

1,875,884

UNITED STATES PATENT OFFICE

DENNIS PARKS, OF ST. LOUIS, MISSOURI

LEATHER GRADING MACHINE

Application filed July 3, 1929. Serial No. 375,642.

The general object of this invention is to provide an improved machine for use in grading leather, which shall be characterized by ease, rapidity and certainty in operation, and by the ability to very accurately grade pieces of leather of varying thickness fed into the machine.

While not limited in application, the machine is intended more particularly for use in grading lifts in the art of heel-building.

In carrying out the object of the invention, I utilize two endless cables forming carriers which travel in juxtaposition to each other and which act to grip the pieces of leather successively passed between them, and adjacent to these carriers I mount two rollers which are separated by a space which gradually narrows from the front to the rear end of the machine. These rollers are rapidly rotated and the carriers operate to pass the pieces of leather or the lifts between them, and when each piece of leather reaches that portion of the space between the rollers which corresponds to its thickness, frictional contact of the rollers therewith withdraws it from the carriers and discharges it into an appropriate receptacle, a number of such receptacles being arranged to extend from end to end of the machine below the rollers.

A distinguishing feature of the invention resides in the fact that the carriers are arranged to yieldingly grip the pieces of leather so that varying thicknesses of leather may be moved through the machine in juxtaposition to each other without interfering with the secure grip of the carriers on the leather.

A further distinguishing feature of the invention is the fact that I employ endless carriers in the form of coiled wire cables arranged to move in parallel relation from end to end of the machine, and which provide a secure grip on the pieces of leather while permitting the ready removal of the pieces of leather from between the wire cables by the grading rollers.

A final distinguishing feature of the invention resides in the fact that the endless carriers for moving the pieces of leather between the grading rollers are guided by upper and lower sets of grooved rollers, the upper set of rollers being pivotally mounted and spring-controlled so as to permit the rollers and the cable or carrier guided thereby, to yield to accommodate varying thicknesses in the pieces of leather passed under the upper set of rollers by the endless carriers.

In the accompanying drawings—

Figure 1 is a plan view of a machine constructed according to my invention;

Figure 2 is a view in front elevation of the same;

Figure 3 is a section on the line 3—3 of Fig. 2, viewed in the direction of the arrows;

Figure 4 is a rear view of a portion of an angle bar, or main supporting member, showing the manner of yieldingly mounting the upper series of rollers over which one of the carrier cables travels; and Figure 5 is a view on an enlarged scale illustrating a portion of one of the carriers.

Referring now the drawings, the numerals 1, 2, indicate standards which are substantially A-shaped in form and located, respectively, at opposite ends of the machine, said standards supporting the operating parts of the machine. Mounted on the upper ends of these standards is a container 3 for holding the lifts or other pieces of leather to be graded, said container extending beyond the standard 1 at the left of the machine, (as shown in Figs. 1 and 2), and projecting forwardly at such extended portion, as indicated at 4 in Fig. 1, the front end of this projecting portion being open and the projection itself providing a table on which the pieces of leather rest in convenient position to be picked up by the operator and fed into the machine. Mounted in bearings 5, 6 provided at each end of the machine, are two cylindrical grading rollers 7, 8, the upper grading roller 7 being mounted in the bearings 5 and the lower grading roller 8, in the bearings 6. The bearings of these rollers are so disposed that at the front end of the machine, that at the left of Figs. 1 and 2, the rollers are separated by a distance approximately a fourth of an inch, while at the rear end of the machine, they are separated by a space of approximately one-sixteenth of an inch. At its rear end, the grading roller 7 is provided with a stub shaft 9 on which is mounted a drive pulley 10 adapted to receive a belt (not shown) driven from any suitable source of power. Mounted on the shaft 9 is a gear 11 which meshes with a similar gear 12 provided on the end of the grading roller 8, whereby the grading rollers may be rotated in unison and at the same rate of speed from the shaft 9. In order to carry the pieces of leather to be graded between the rollers 7 and 8, I provide the following mechanism:

Mounted at the top of the standards 1, 2 at the front of the machine and extending from end to end thereof is an angle bar 13 (Figs. 3 and 4) on the front face of which are mounted an upper series of guide rollers 14 and a lower series of guide rollers 15. These rollers are circumferentially grooved to receive the cables or other endless carriers 16, 17. Mounted in suitable bearings at each end of the machine is a substantially vertically disposed shaft 18 on which is secured a drive pulley 19 having two circumferential grooves 20 and 21, and around these pulleys pass the two endless carriers 16 and 17, the carrier 16 being received in the groove 20 and the carrier 17, in the groove 21. In the drawings, I have only shown one of the pulleys 19, but that at the other end of the machine is of exactly the same construction, being mounted on a vertically disposed shaft 22, similar to the shaft 18 (Fig. 2). Extending from end to end of the machine is a drive shaft 23 mounted at each end in bearings 24 and provided at one end with a pulley 25. The stub shaft 9, previously referred to, is provided with a drive pulley 26 and a belt 27 passes over pulleys 25 and 26, whereby shaft 23 is driven from stub shaft 9 when the latter is rotated by pulley 10. Mounted on the shaft 23 at each end thereof is a bevel gear 28, which meshes with a bevel gear 29 provided at the lower end of the respective shafts 18, 22. When the shaft 23 is rotated the pulleys 19 will be driven to move the carriers 16 and 17 simultaneously and at the same rate of speed in a direction from left to right of the machine, as shown in Figs. 1 and 2.

As shown in Figs. 3 and 4, the lower guide rollers 15 are mounted on stub shafts 30 which, in turn, are rotatably mounted in the angle bar 13. The upper rollers 14, however, are adapted to yield in an upward direction to accommodate varying thicknesses of leather moved under them by the carriers 16 and 17. To this end, the shaft 31 of each of these rollers passes through an enlarged opening 31a in the angle bar 13, and is rotatably mounted in the end of a short lever 32 which is pivotally mounted at its opposite end, as indicated at 33, on the angle bar 13. Each of the levers 32 is provided with a socket 34 intermediate its ends, in which is seated a coil spring 35 the upper end of which bears against the upper flange 36 of the angle bar 13, as clearly shown in Fig. 4. The rollers 14 are staggered with relation to the rollers 15 so as to permit the carrier 17 to yield at the point immediately under a roller 14. The rollers 14 and 15 are spaced at such distance from each other that the carriers 16 and 17 will be normally in contact as they pass between the two sets of rollers, the upper set of rollers 14 being normally pressed downward by the coil springs 35.

The grooves 20 and 21 of the pulley 19 at the left or front end of the machine are spaced at such distance apart as to separate the carriers 17 and 18 to permit of pieces of leather being readily inserted between the two carriers by the operator. After passing beyond the pulley 19, however, the rollers 14, in co-operation with the rollers 15, force these carriers to travel in parallel relation to each other.

As heretofore stated, I preferably construct the carriers of coiled wire, and to make the advantage of this type of endless carrier more apparent, I have illustrated a portion of one of the carriers in Fig. 5. From this view, it will be seen that as the coils necessarily are in a plane extending substantially at right angles to the direction of travel of the carriers, they form engaging surfaces which enable the carriers to firmly grip the pieces of leather placed between them, so that they may be positively drawn between the grading rollers until they reach that portion of the space between the rollers which corresponds to the thickness of the leather. At this point, the grading rollers frictionally engage the piece of leather and pull it from between the carriers in a direction at right angles to its direction of movement. It will be apparent that as the coils are parallel with the line of movement of the leather as it is pulled outward by the carriers, they will offer very little resistance to such movement.

In operation, the container 3 being supplied with the pieces of leather to be graded, the operator takes up pieces of leather from the table 4, and inserts them in succession between the carriers 16 and 17 in the space adjacent to the pulley 19 at the front or lefthand end of the machine. By moving each piece of leather as inserted to the right, it is engaged by the carriers 16 and 17 and carried between the rollers 14 and 15 from the front to the rear end of the machine. The carriers are usually in contact with each other, and as each piece of leather passes under a roller 14, the carrier 16 and such roller yields in an upward direction against the resistance of the coil spring 35, which restores the roller and said carrier to the normal position as soon as the piece of leather has passed beyond it. As, in practice, the pieces of leather will be rapidly inserted between the carriers, the yielding of the rollers 14 and the carrier 16 is very important, as it permits of the carriers maintaining a firm grip on the pieces of leather regardless of the varying thicknesses of the latter. For example, if a piece of leather an eighth of an inch in thickness passes under a roller 14 and the next piece of leather is only a sixteenth of an inch thick, the roller and the carrier 16 will yield in an upward direction to accommodate the thickness of the first piece, which is also facilitated by a downward yielding of the carrier 17 between the two adjacent lower rollers 15, and the carriers immediately move toward each other as soon as the thicker piece of leather has passed under the roller 14 to enable the carriers to grip, or maintain the grip, on the thinner piece of leather following.

In practice, any desired number of containers may be positioned side by side to extend lengthwise of the machine under the grading rollers 7 and 8 to receive the pieces of leather thrown out at various points along the length of said rollers. These are usually in the form of bags suspended from the machine, and any number of bags up to, say, ten, can be employed for this purpose. I have shown a number of these bags positioned along the length of the machine in Fig. 1 and have indicated the same by the numeral 36 and have also shown one of these bags in Fig. 3. I have omitted illustrating the bags in Fig. 2 to avoid concealing the parts of the machine there illustrated.

From the above statement of the operation, it will be seen that the grading rollers will operate automatically to remove from the carriers and discharge from the machine at various points throughout their length pieces of leather which correspond in thickness to the width of the space between the rollers at such points. It will also be seen that the greater the number of containers 36 that are employed, the more accurate the grading will be.

While I have shown and described the grading rollers as being cylindrical and arranged in converging relation to each other to provide a gradually narrowing space extending throughout the length of the rollers, it will be obvious to those skilled in the art that I could equally well employ the construction of grading rollers shown in the prior patent to Mitchell & Parks, No. 1,163,358, dated December 7th, 1915, in which one of the rollers is provided with a series of separated grading areas but in which the space as a whole between the rollers gradually narrows, as in the present instance.

I claim:

1. A leather grading machine, comprising a pair of cylindrical grading rollers located one above the other and arranged in converging relation to each other to provide a space between them gradually narrowing in width from one end of the rollers to the other, and means located at the rear of said rollers for successively conveying pieces of leather lengthwise of the rollers with a portion of each piece projecting into the space between the rollers, comprising a pair of endless carriers formed of coiled wire and extending parallel with the rollers in contact with each other substantially throughout the length of the rollers.

2. A leather grading machine, comprising a pair of grading rollers having a space between them gradually narrowing in width from one end of the rollers to the other, a pair of endless carriers extending parallel with said rollers throughout the length thereof, and an upper and lower set of rollers between which said carriers are guided to move in parallel relation to each other, one set of said rollers being yieldably mounted.

3. A leather grading machine, comprising a pair of grading rollers having a space between them gradually narrowing in width from one end of the rollers to the other, a pair of endless carriers extending parallel with said rollers throughout the length thereof, and an upper and lower set of rollers between which said carriers are guided to move in parallel relation to each other, the upper set of said rollers being yieldably mounted and staggered with relation to the lower set.

4. A leather grading machine, comprising a pair of grading rollers having a space between them gradually narrowing in width from one end of the rollers to the other, a pair of endless carriers extending parallel to said rollers throughout the length thereof in contact with each other, a double-grooved pulley at each end of said rollers for supporting and actuating said carriers, the grooves of the pulley at the more widely separated ends of the rollers being spaced apart a distance to separate the carriers, and an upper and lower set of rollers extending throughout the length of said grading rollers and between which the carriers are guided in parallel relation to each other, the upper set of said rollers being pivotally mounted and spring-controlled.

In testimony whereof, I have hereunto set my hand.

DENNIS PARKS.